(12) United States Patent
Kifuku et al.

(10) Patent No.: US 6,694,237 B2
(45) Date of Patent: Feb. 17, 2004

(54) STEERING CONTROL DEVICE

(75) Inventors: Takayuki Kifuku, Tokyo (JP);
Munenori Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/121,622

(22) Filed: Apr. 15, 2002

(65) Prior Publication Data

US 2003/0045981 A1 Mar. 6, 2003

(30) Foreign Application Priority Data

Aug. 30, 2001 (JP) ....................... 2001-261900

(51) Int. Cl.$^7$ .............................................. B62D 5/00
(52) U.S. Cl. ........................................ 701/41; 180/400
(58) Field of Search ............................ 701/41; 180/421, 180/422, 443, 446, 400

(56) References Cited

U.S. PATENT DOCUMENTS 5,040,630 A    8/1991   Morishita et al.
6,266,591 B1 * 7/2001   Wilson-Jones et al. ....... 701/41

FOREIGN PATENT DOCUMENTS

| JP | 1/186468     |   | 7/1989 |          |
|----|--------------|---|--------|----------|
| JP | 02092781 A   | * | 4/1990 | B62D/5/04|
| JP | 07-031189    |   | 1/1995 |          |
| JP | 2682564      |   | 8/1997 |          |
| JP | 2762370      |   | 3/1998 |          |

* cited by examiner

*Primary Examiner*—Yonel Beaulieu

(57) ABSTRACT

A steering control device is provided, which comprises a motor driving circuit for driving a motor and a microprocessor for supplying an applied voltage signal, which is found based on a motor current detection value detected by a motor current detecting unit, a motor voltage detection value detected by a motor voltage detecting unit, a steering torque detected by a torque sensor and a vehicle speed detected by a vehicle speed sensor, to the motor driving circuit such that the motor driving circuit increases or decreases the motor current according to an average value of motor current detection values over a time period and increases or decreases the motor current by detecting that a steering is in the vicinity of a maximum steering angle based on the detected steering torque.

19 Claims, 16 Drawing Sheets

1A

STEERING CONTROL DEVICE

This application is based on application no. 2001-261900, filed in Japan on Aug. 30, 2001, the contents of which are hereby incorporated by reference.

BACKGROUND OF THE INVENTION

1. Field of the Invention

The present invention relates to a steering control device for an automobile or the like.

2. Description of the Related Art

A conventional steering control device will be described with reference to drawings. FIGS. 17 and 18 show a configuration and an operation of a conventional steering control device disclosed in, for example, Japanese Patent No. 1929781.

In FIG. 17, reference numeral 1 denotes a conventional steering control device, numeral 2 denotes a torque sensor, numeral 3 denotes a vehicle speed sensor and numeral 4 denotes a motor.

In addition, in the figure, the conventional steering control device 1 is provided with steering torque measuring means 91, vehicle speed measuring means 92, motor current measuring means 93, motor average current calculating means 94, motor current storing means 95, motor current determining means 96, electromagnetic clutch controlling means 97, power element controlling means 98 and power element unit for motor drive 99.

As shown in a graph of FIG. 18, the conventional steering control device 1 gradually decreases or increases a motor current (output) according to an average value of motor currents to protect the entire device from heating.

In the above-mentioned conventional steering control device, when a steering once knocks an end, the entire device or a component such as a motor or a control device is heated and a motor current is gradually decreased. As a result, it takes time to cause a motor output torque to return to an initial state.

SUMMARY OF THE INVENTION

The present invention has been devised to solve the above-mentioned problem, and it is an object of the present invention to provide a steering control device for eliminating deterioration of steering feeling due to a sudden change of a motor current and further suppressing decrease in an output due to protection against heating by reducing loss in the vicinity of a maximum steering angle of the steering while protecting the device from heating.

In order to attain the above-mentioned object, a steering control device in accordance with the present invention is provided with first motor current limit value calculating means for increasing and decreasing a motor current according to an average value of motor currents over a time period and second motor current limit value calculating means for decreasing a motor current upon determining that a steering is in the vicinity of a maximum steering angle and increasing a motor current upon determining that the steering is not in the vicinity of the maximum steering angle.

In addition, in the steering control device in accordance with the present invention, the second motor current limit value calculating means determines that the steering is in the vicinity of the maximum steering angle to decrease the motor current when a predetermined state quantity is equal to or larger than a first predetermined value and determines that the steering is not in the vicinity of the maximum steering angle to increase the motor current when the predetermined state quantity is equal to or smaller than a second predetermined value.

In addition, in the steering control device in accordance with the present invention, the second motor current limit value calculating means determines that the steering is in the vicinity of the maximum steering angle to decrease the motor current when a predetermined state quantity is equal to or smaller than a first predetermined value and determines that the steering is not in the vicinity of the maximum steering angle to increase the motor current when the predetermined state quantity is equal to or larger than a second predetermined value.

In addition, in the steering control device in accordance with the present invention, the predetermined state quantity is a steering torque.

In addition, in the steering control device in accordance with the present invention, the predetermined state quantity is a steering angle.

In addition, in the steering control device in accordance with the present invention, the predetermined state quantity is a motor current.

In addition, in the steering control device in accordance with the present invention, the f first predetermined value is a saturation value of the motor current.

In addition, in the steering control device in accordance with the present invention, the first predetermined value is a motor current limit value.

In addition, in the steering control device in accordance with the present invention, the first predetermined value is a motor current limit value found by the first motor current limit value calculating means.

In addition, in the steering control device in accordance with the present invention, the predetermined state quantity is a detection value of a motor current.

In addition, in the steering control device in accordance with the present invention, the predetermined state quantity is a steering speed.

In addition, in the steering control device in accordance with the present invention, the steering speed is calculated at least from a motor voltage and a motor current.

In addition, in the steering control device in accordance with the present invention, a motor is controlled with a smaller one of a first motor current limit value found by the first motor current limit value calculating means and a second motor current limit value found by the second motor current limit value calculating means as a limit value of a motor current.

In addition, in the steering control device in accordance with the present invention, determination threshold values indicating that the steering is in the vicinity of the maximum steering angle are the first and the second predetermined values and hysteresis is provided by setting the first and the second predetermined values to be different from each other.

In addition, in the steering control device in accordance with the present invention, the second motor current limit value calculating means determines that the steering is in the vicinity of the maximum steering angle when a first determination condition for determining that the steering is in the vicinity of the maximum steering angle is met for a predetermined time period or more and determines that the steering is not in the vicinity of the maximum steering angle when a second determination condition for determining that the steering is not in the vicinity of the maximum steering angle is not met for a predetermined time period or more.

In addition, in the steering control device in accordance with the present invention, the second motor current limit value calculating means increases or decreases a motor current only when a vehicle speed is equal to or smaller than a predetermined value.

Moreover, in the steering control device in accordance with the present invention, the second motor current limit value calculating means sets an increasing speed of a motor current larger than a decreasing speed.

The steering control device in accordance with the present invention is provided with: motor current detecting means for detecting a motor current; motor voltage detecting means for detecting a motor voltage; a motor driving circuit for driving a motor; and a microprocessor for supplying an applied voltage signal, which is found based on a motor current detection value detected by the motor current detecting means, a motor voltage detection value detected by the motor voltage detecting means, a steering torque detected by a torque sensor and a vehicle speed detected by a vehicle speed sensor, to the motor driving circuit such that the motor driving circuit increases or decreases the motor current according to an average value of motor current detection values over a time period and increases or decreases the motor current by detected that a steering is in the vicinity of a maximum steering angle based on a predetermined state quantity.

Moreover, in the steering control device in accordance with the present invention, the microprocessor comprises: steering speed calculating means for calculating a steering speed based on the motor current detection value and the motor voltage detection value; target current calculating means for calculating a motor current target value based on the detected steering torque, the detected vehicle speed and the steering speed; first motor current limit value calculating means for calculating a first motor current limit value based on the motor current detection value; second motor current limit value calculating means for calculating a second motor current limit value using the predetermined state quantity; motor current limiting means for limiting the calculated motor current target value using the first motor current limit value and the second motor current limit value; and motor current feedback control means for finding a voltage signal applied to the motor such that the limited motor current target value and the motor current detection value coincide with each other.

Other objects and features of the present invention will be apparent from the following descriptions taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be hereinafter described with reference to the drawings.

First Embodiment

Figure 1:
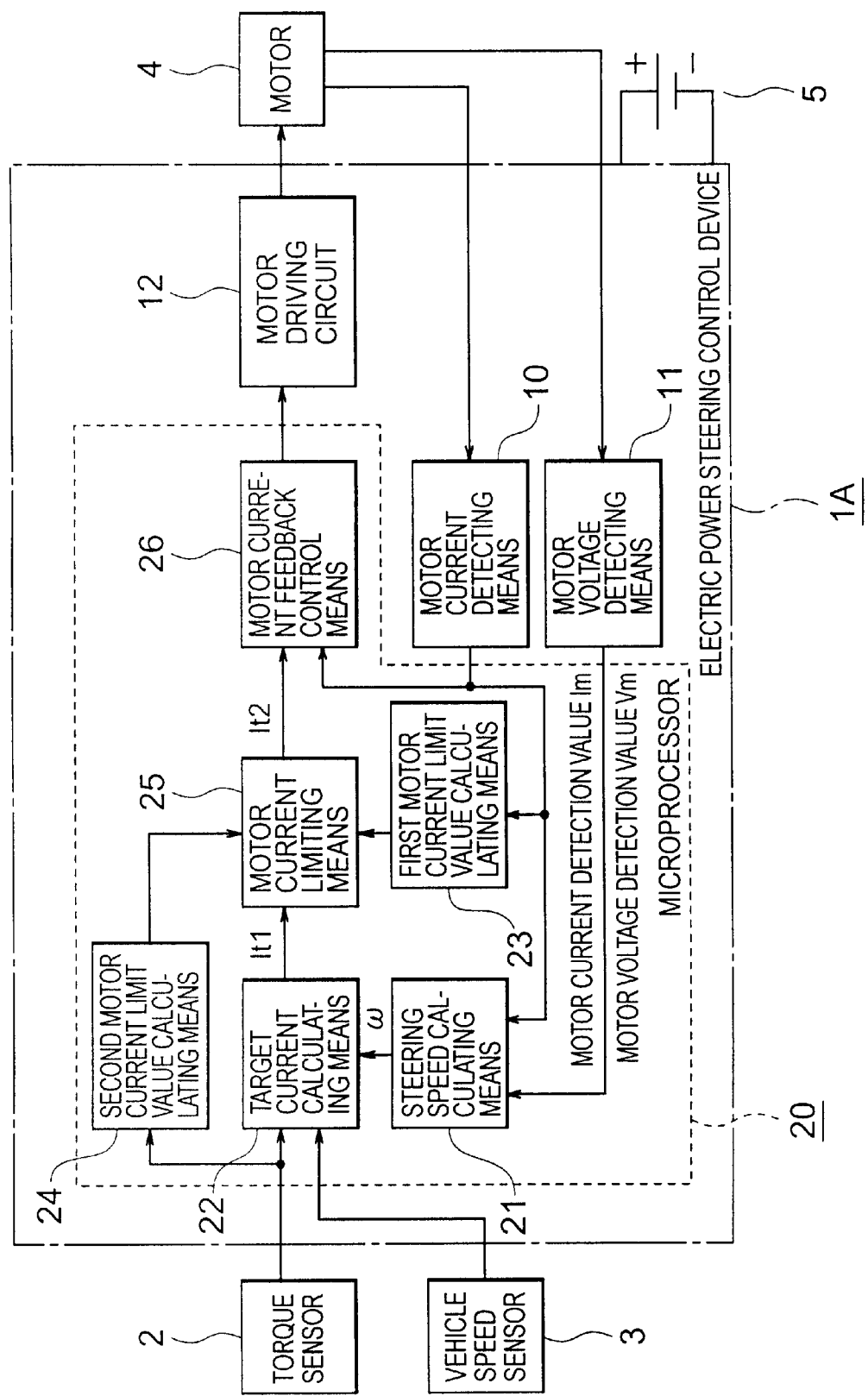
FIG. 1 is a block diagram showing a configuration of a steering control device in accordance with a first embodiment of the present invention.

A steering control device in accordance with a first embodiment of the present invention will be described with reference to the drawings. FIG. 1 shows a configuration of the steering control device in accordance with the first embodiment of the present invention. Further, in each of the attached drawings, identical reference numerals denote identical or corresponding parts.

In FIG. 1, reference numeral 1A denotes an electric power steering control device, to which a torque sensor 2 for detecting a steering torque and a vehicle speed sensor 3 for detecting speed are connected as input signal sources, a motor 4 is connected as a load and a battery 5 is connected as a power source.

In addition, in FIG. 1, the electric power steering control device 1A is constructed of motor current detecting means 10, motor voltage detecting means 11, a motor driving circuit 12 and a microprocessor 20.

Moreover, in FIG. 1, are implemented as a software in the microprocessor 20, steering speed calculating means 21 for calculating a steering speed based on a motor current detection value detected by the motor current detecting means 10 and a motor voltage detection value detected by the motor voltage detecting means 11, target current calculating means 22 for calculating a motor current target value based on a steering torque detected by the torque sensor 2, a vehicle speed detected by the vehicle speed sensor 3 and the steering speed, first motor current limit value calculating means 23 for calculating a first motor current limit value based on the motor current detection value, second motor current limit value calculating means 24 for calculating a second motor current limit value using the detected steering torque, motor current limiting means 25 for limiting the motor current target value calculated by the target current calculating means 22 using the first motor current limit value and the second motor current limit value, and motor current feedback control means 26 for finding a voltage signal applied to the motor 4 (hereinafter referred to as PWM signal) such that the motor current target value limited by the motor current limiting means 25 and the motor current detection value coincide with each other.

The motor 4 is driven by the motor driving circuit 12 based on the PWM signal that is an output from the microprocessor 20.

Next, an operation of the steering control device in accordance with the first embodiment will be described with reference to the drawings.

Figure 2:
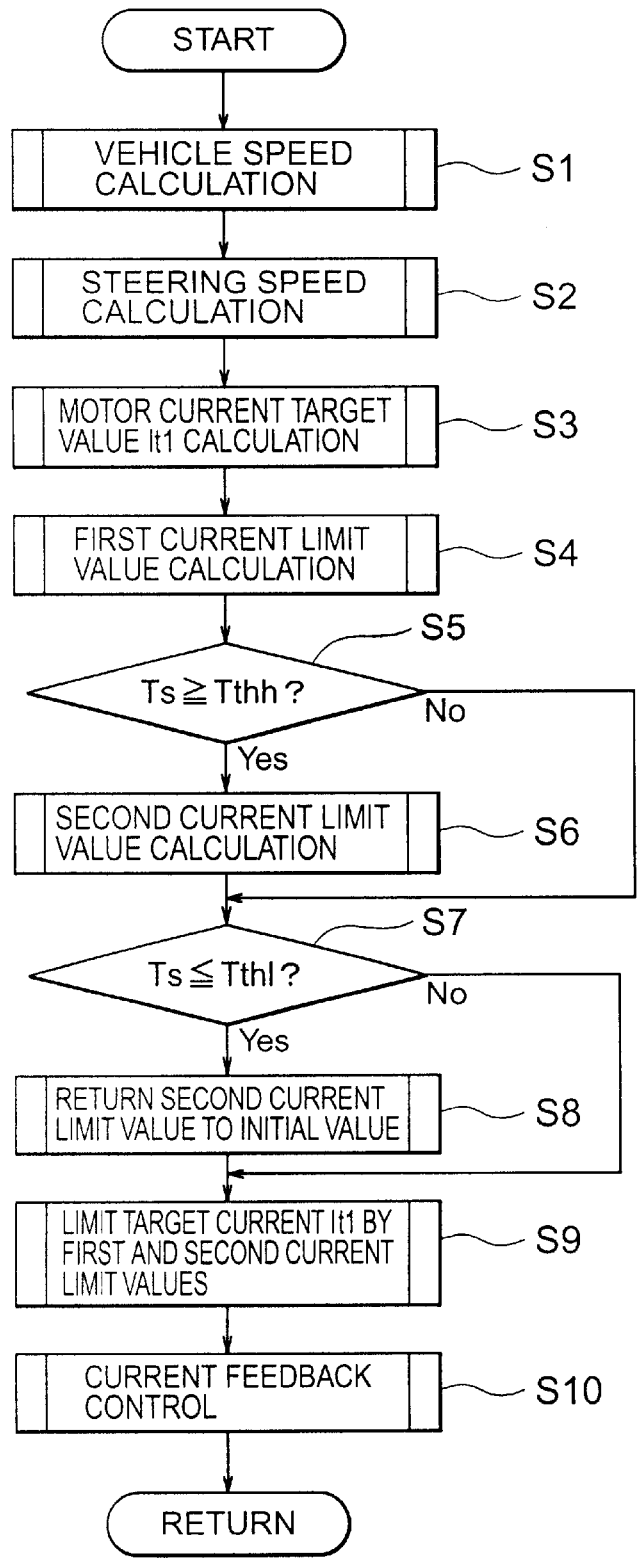
FIG. 2 is a flow chart showing an operation of the steering control device in accordance with the first embodiment of the present invention.

FIG. 2 is a flow chart showing an operation of a program implemented in the microprocessor of the steering control device in accordance with the first embodiment of the present invention.

The operation of the first embodiment will be hereinafter described with reference to the flow of FIG. 2. Further, it is assumed that the program of FIG. 2 is periodically executed.

First, in step S1, the microprocessor 20 calculates a vehicle speed from a vehicle speed signal of the vehicle speed sensor 3.

Next, in step S2, the microprocessor 20 calculates a steering speed. This step corresponds to an operation of the steering speed calculating means 21 shown in FIG. 1. The motor 4 is a DC motor with permanent magnet field, in which a motor back electromotive force is proportional to a motor rotation speed. Then, in step S2, the microprocessor 20 calculates a motor back electromotive force Em from a motor current detection value Im detected by the motor current detecting means 10 and a motor voltage detection value Vm detected by the motor voltage detecting means 11 to find a steering speed ω as indicated by the following expression (1).

$$Em = Vm - Ra \times Im - Vb$$
$$\omega = Em/Ke \quad (1)$$

Where reference character Ra denotes an armature resistance of the motor 4, Vb denotes a voltage fall of a brush of the motor 4, ω denotes a steering speed, and Ke denotes a predetermined constant determined from a back electromotive force constant of the motor 4 and a reduction ratio of the motor 4.

Next, in step S3, the microprocessor 20 calculates a target value of a motor current. This step corresponds to an operation of the target current calculating means 22 shown in FIG. 1. First, the microprocessor 20 calculates a steering assist current Itrq from the vehicle speed calculated in step S1 and the steering torque detected by the torque sensor 2 as shown, for example, in FIG. 3. Then, the microprocessor 20 corrects the steering assist current Itrq based on the steering speed ω calculated in step S2 to find a motor current target value It1 as indicated by the following expression (2).

$$It1 = Itrq - \omega \times kdmp \quad (2)$$

Here, kdmp is a constant that becomes large when a vehicle speed is high. Thus, operation stability when a vehicle is moving at high speed can be improved.

Next, in step S4, the microprocessor 20 calculates a first motor current limit value. This step S4 corresponds to an operation of the first motor current limit value calculating means 23 shown in FIG. 1. The first motor current limit value calculating means 23 gradually decreases or increases a motor current limit value according to a magnitude of a motor current that has a constant relation with heating in order to protect the electric power steering control device 1A from destruction caused by heating.

Figure 5:
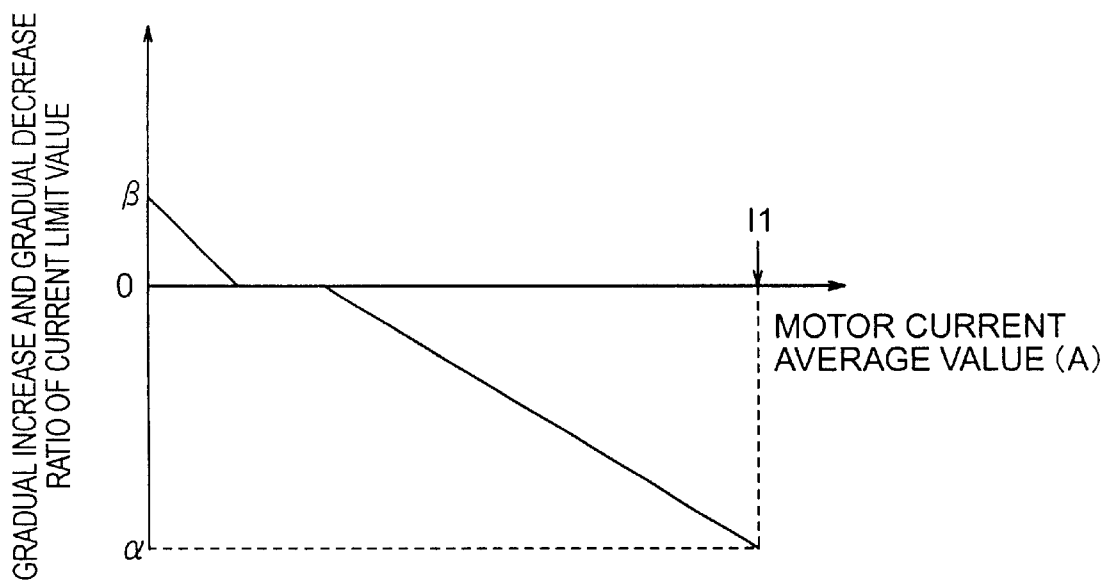
FIG. 5 illustrates an operation of first motor current limit value calculating means of the steering control device in accordance with the first embodiment of the present invention.

In this embodiment, the microprocessor 20 calculates a first motor current limit value Iovh1 as indicated by the following expression (3) in an attempt to gradually decrease a motor current at a ratio of α for one sampling period when the motor current is I1 based on a property shown in FIG. 5. FIG. 5 shows a relation between an average value of motor currents and a gradual increase/decrease ratio of a current limit value.

$$Iovh1(n) = Iovh1(n-1) - \alpha \quad (3)$$

The motor 4 and the control device 1A have relatively gentle change in temperature increase over a time period when thermal capacities of an armature coil and a heat sink are sufficiently large. The current limit value found in step S4 is for protecting the apparatus from such temperature increase. The current limit value is set such that a rated current I1 is flown for a long time period sufficient for enduring practical use, and further, deterioration of steering feeling or the like due to sudden change in a current is not caused.

Next, in steps S5 to S8, the second motor current limit value is calculated. These steps correspond to an operation of the second motor current limit value calculating means 24. The second motor current limit value is for suppressing power consumption of the electric power steering control device 1A by preventing an unnecessary current from flowing when the steering is in the vicinity of a maximum steering angle.

First, in step S5, the second motor current limit value calculating means 24 determines whether the steering has reached the maximum steering angle. When a steering torque Ts is equal to or larger than a steering torque Tthh that is large enough compared with a steering torque at the time of stationary steering, it is likely that the steering knocks the end. For example, in FIG. 3, even if forces are balanced at a steering torque Tn and a motor current In at the time of stationary steering, it is likely that the steering torque increases to around Tmax in the vicinity of the maximum steering angle. Thus, when Ts is equal to or larger than Tthh, the second motor current limit value calculating means 24 determines that the steering has reached the maximum steering angle and advances to step S6. When it is determined that the steering is not at the maximum steering angle, the second motor current limit value calculating means 24 advances to step S7.

Subsequently, in step S6, a processing is performed when it is determined in step S5 that the steering has reached the maximum steering angle. In this case, as indicated by the following expression (4), the second motor current limit value calculating means 24 calculates a second motor current limit value Iovh2 in an attempt to gradually decrease a motor current at a speed of motor current β for one sampling period.

$$Iovh2(n)=\max(Iovh2(n-1)-\beta, I2) \quad (4)$$

Where max ( ) means that the larger one of the expressions in the parentheses is taken. In addition, I2 is a predetermined motor current value taking a minimum current value that can hold the steering in the vicinity of the maximum steering angle. As a result, the second motor current limit value gradually decreases at a constant speed β when the steering reaches the maximum steering angle and converges to a minimum current I2 that can hold the steering in the vicinity of the maximum steering angle. Thus, even if a motor current is limited to the motor current limit value Iovh2, the steering torque does not fluctuate.

Then, the second motor current limit value calculating means 24 advances to steps S7 and S8. Procedures in these steps are performed for returning the second motor current limit value gradually decreased in step S6 to an initial value. When the steering torque Ts is equal to or smaller than the steering torque Tth1 that is small enough compared with the determination threshold value Tthh, the second motor current limit value calculating means 24 determines that the steering has returned from the maximum steering angle and advances to step S8, and returns the second motor current limit value to the rated current value I1 at a speed of a motor current γ for one sampling period. On the other hand, when Ts is larger than Tth1, the previously calculated second motor current limit value is held.

As described above, hysteresis is provided with a determination threshold value of the maximum steering angle of the steering torque set as Tthh and a determination threshold value of returning from the maximum steering angle set as Tth1, which are different from each other. As a result, determination of a maximum steering angle is subject to hunting in such a case in which a steering force fluctuates in the vicinity of the maximum steering angle and a motor current can be prevented from repeating gradual decrease and increase, whereby incongruousness of steering feeling can be restrained.

In addition, γ is set equal to or larger than β and a returning speed is set faster than a gradual decrease speed. Since the gradual decrease speed is set slower, incongruousness of steering feeling can be restrained even in such a case in which a maximum steering angle is detected erroneously in step S5 or a vehicle is too heavy and the steering cannot be held at a maximum steering angle with the motor current I2. In addition, as the returning speed is set faster, a rated current can be flown promptly when the steering returns from the maximum steering angle, whereby incongruousness of steering feeling can also be restrained.

Next, in step S9, a target current is limited by the first and the second current limit values. This step corresponds to an operation of the motor current limiting means 25 of FIG. 1. That is, the first motor current limit value and the second motor current limit value found as described above are compared in step S9. The motor current target value It2 is set such that the motor current target value It1 is limited to a value equal to or smaller than the smaller one of the motor current limit values.

Lastly, in step S10, current feedback control is performed. This step corresponds to an operation of the motor current feedback control means 26 of FIG. 1. That is, the control is performed such that the motor current target value It2 limited in step 9 and the motor current detection value Im detected by the motor current detecting means 10 coincide with each other to output a PWM signal. With this PMW signal, the microprocessor 20 drives the motor driving circuit 12 to flow a desired current to the motor 4.

Figure 4:
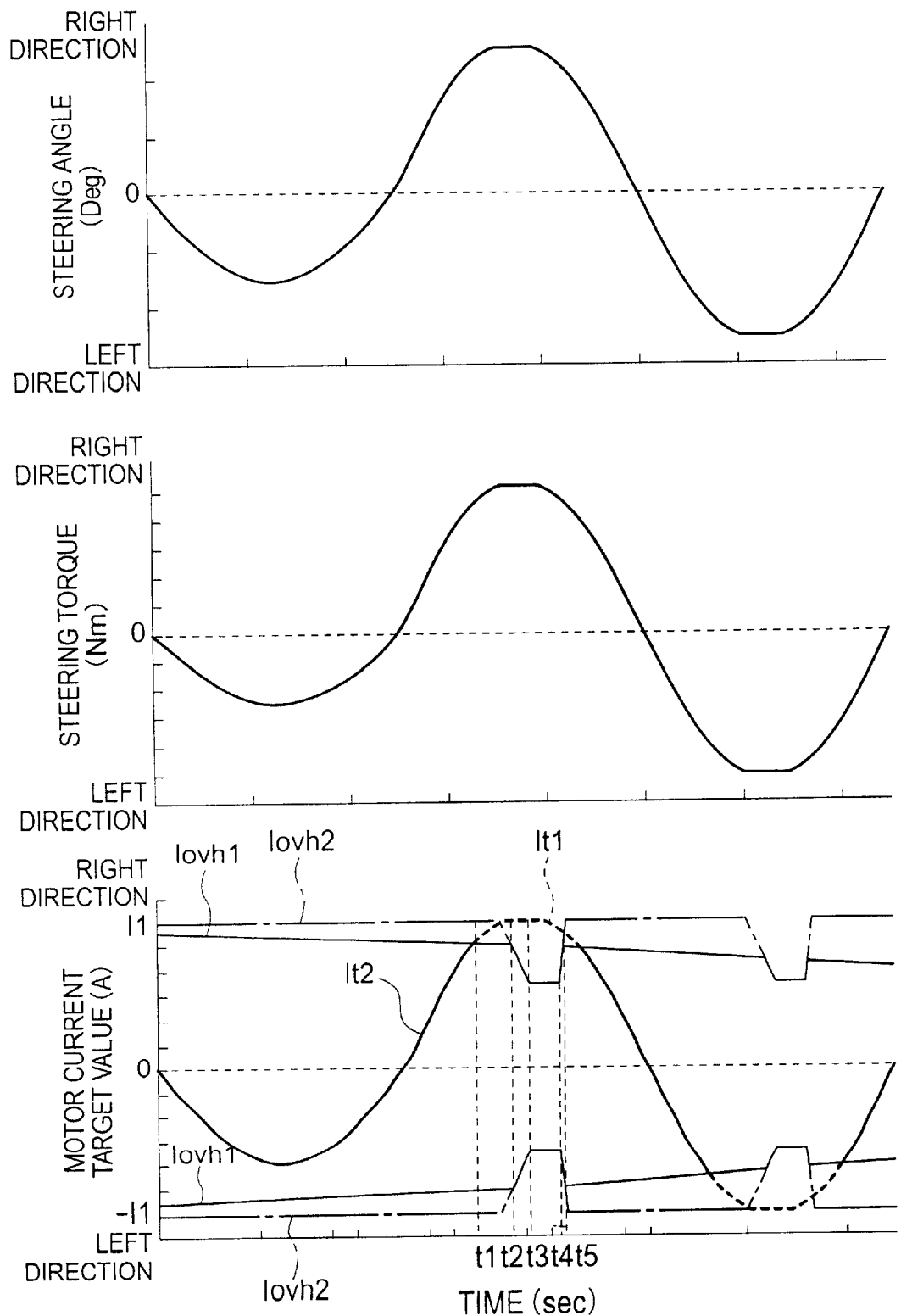
FIG. 4 is a timing chart showing an operation of the steering control device in accordance with the first embodiment of the present invention.

FIG. 4 shows a result of applying the first embodiment to the operation of the steering control device. Shown in FIG. 4 are relations among the steering angle St, the steering torque Ts, the first motor current limit value Iovh1, the second motor current limit value Iovh2 as well as the motor current target values It1 and It2 before and after limited by the above-mentioned first and the second motor current limit values when steering to left and right maximum steering angles is repeated while the vehicle is at rest. Here, a current in the right steering direction is positive and a current in the left steering direction is negative.

The first motor current limit value Iovh1 gently changes according to an average value of motor currents over a time period. For example, between the time t1 and the time t2 of FIG. 4, the motor current target value It1 is limited to a value equal to or smaller than the first motor current limit value Iovh1, whereby the motor current target value It1 acts to eliminate deterioration of steering feeling or the like due to sudden change of the motor current while protecting the device from heating.

On the other hand, the second motor current limit value Iovh2 promptly decreases in the vicinity of the maximum steering angle between the time t2 and the time t3 of FIG. 4 and immediately increases in the parts other than in the vicinity of the maximum steering angle at or after the time t4. In this way, the second motor current limit value Iovh2 acts not to flow an unnecessary current only when the steering knocks the end, thereby suppressing power consumption of the electric power steering device. Thus, change in the first motor current limit value over a time period can be made more gentle and decrease in an assist force can be further suppressed.

As described above, according to the first embodiment, an electric power steering device can be realized, which eliminates deterioration of steering feeling or the like due to sudden change of a motor current while protecting itself from heating and further suppresses decrease in a steering support force due to protection from heating by decreasing loss in the vicinity of the maximum steering angle.

Further, although the second motor current limit value calculating means 24 of the first embodiment gradually increases a motor current limit value at the predetermined speed λ when the steering returns from the maximum steering angle, the motor current limit value may be set such that it immediately becomes the rated current I1. In this case, the rated current is immediately obtained when the steering returns from the maximum steering angle and response of the motor current limit value can be improved.

Figure 6:
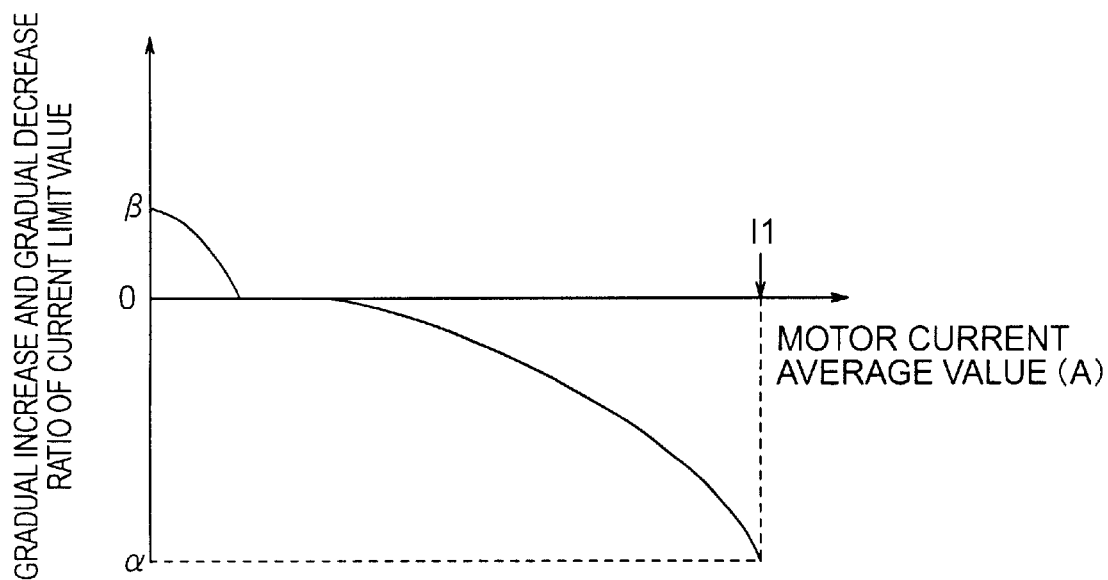
FIG. 6 shows an example of setting a characteristic of the first motor current limit value calculating means of the steering control device in accordance with the first embodiment of the present invention.

In addition, although the first motor current limit value calculating means 23 of the first embodiment attains a motor current limit based on an average value of motor currents over a time period from the table of the motor current average value and the motor current gradual decrease speed of FIG. 5, the property of FIG. 5 may be, for example, a nonlinear property as shown in FIG. 6. In this case, since a gradual decrease speed increases like power functions at large-current, more appropriate protection is realized.

Figure 7:
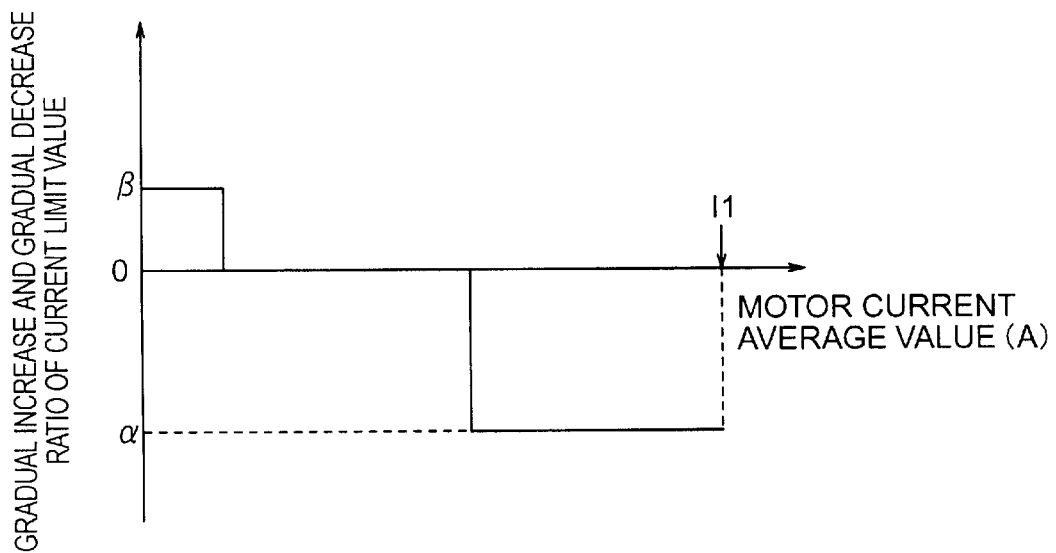
FIG. 7 shows an example of setting a characteristic of the first motor current limit value calculating means of the steering control device in accordance with the first embodiment of the present invention.

In addition, as shown in FIG. 7, the first motor current limit value calculating means 23 may be configured to gradually decrease a motor current at a constant speed when an average value of motor currents over a time period within a predetermined time period exceeds a predetermined value. In this case, an amount of calculation can be decreased.

Figure 8:
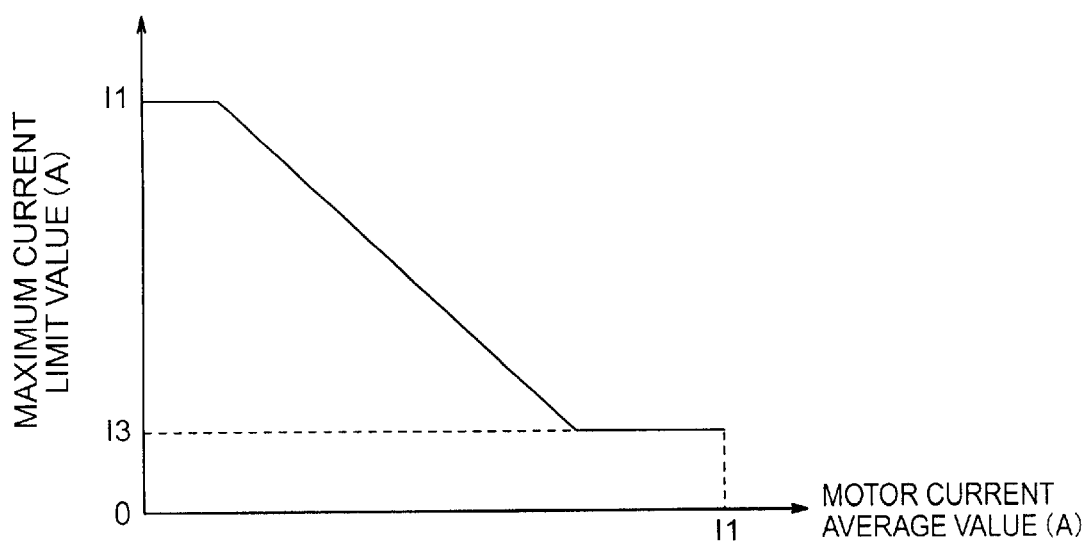
FIG. 8 shows an example of setting a characteristic of the first motor current limit value calculating means of the steering control device in accordance with the first embodiment of the present invention.

Moreover, as shown in FIG. 8, the first motor current limit value calculating means 23 may be configured to directly find a maximum value of a motor current from an average value of motor currents over a time period within a predetermined time period. In this case, an amount of calculation can be decreased as well.

Second Embodiment

A steering control device in accordance with a second embodiment of the present invention will be described with reference to the drawings.

Figure 9:
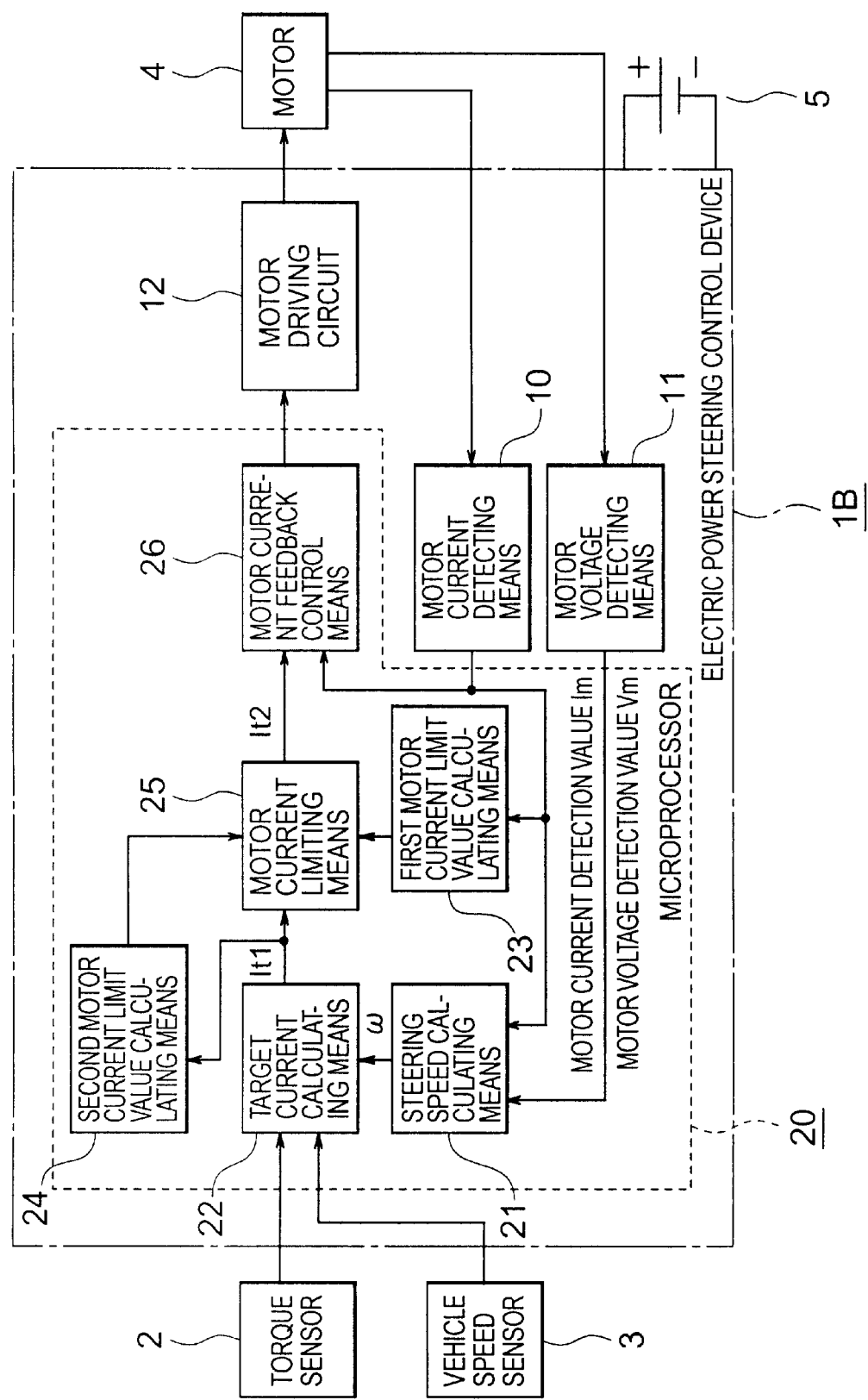
FIG. 9 is a block diagram showing a configuration of a steering control device in accordance with a second embodiment of the present invention.

FIG. 9 shows a configuration of the steering control device in accordance with the second embodiment of the present invention.

Figure 10:
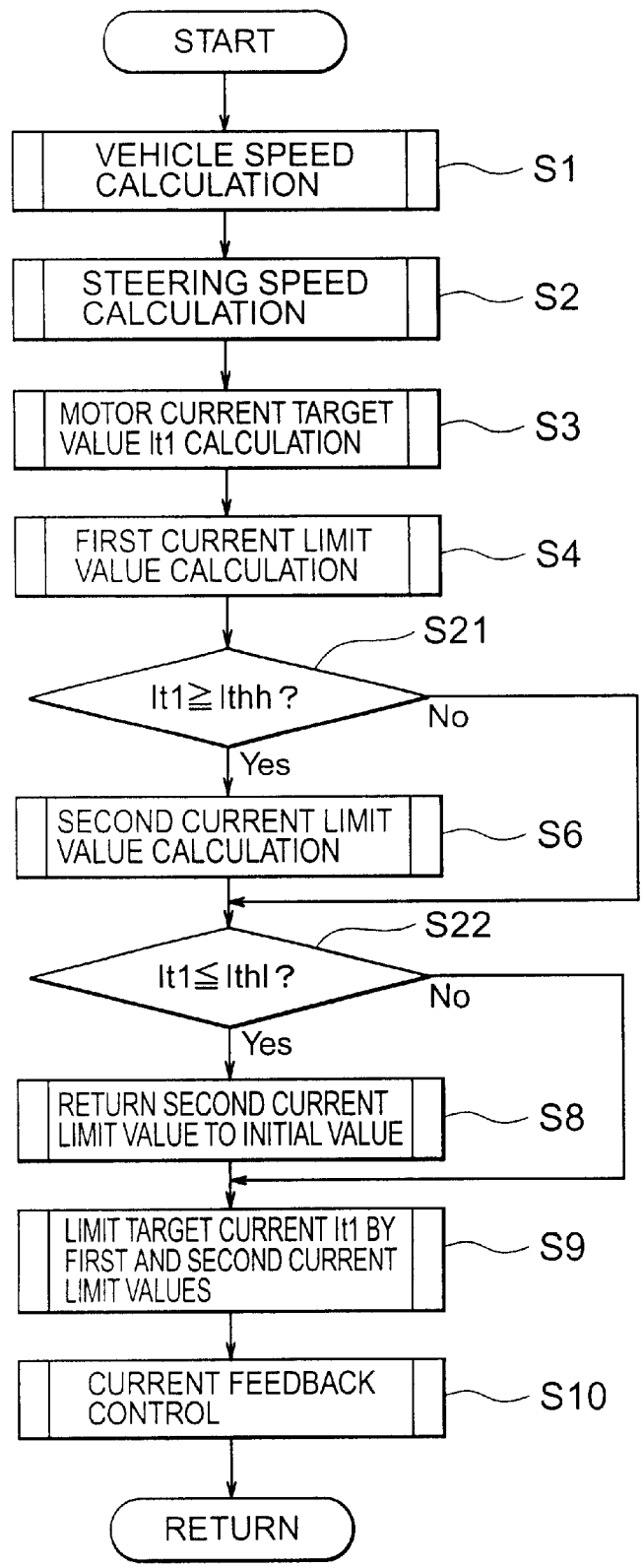
FIG. 10 is a flow chart showing an operation of the steering control device in accordance with the second embodiment of the present invention.

FIG. 10 is a flow chart showing an operation of the steering control device in accordance with the second embodiment of the present invention.

Although a steering torque is used for determining a maximum steering angle of a steering in the first embodiment, a motor current is used for the same purpose in the second embodiment.

In FIG. 9, reference numeral 24 denotes a second motor current limit value calculating means for determining a maximum steering angle using a motor current, to which the motor current target value It1 is inputted from the target current calculating means 22.

In FIG. 10, steps S21, S6, S22 and S8 correspond to an operation of the second motor current limit value calculating means 24. Further, the other steps are denoted by the same reference numerals as in the first embodiment and descriptions of the steps are omitted. An operation of the second motor current limit value calculating means 24 will be hereinafter described with reference to the flow of FIG. 10.

First, in step S21, a processing is performed for determining whether a steering has reached a maximum steering angle. When the motor current target value It1 is equal to or larger than the current Ithh that is large enough compared with a motor current at the time of stationary steering, it is likely that the steering knocks the end. For example, in FIG. 3, even if the steering torque Tn and the motor current In are balanced out at the time of stationary steering, it is likely that the motor current increases to around Imax in the vicinity of the maximum steering angle. Thus, the second motor current limit value calculating means 24 determines that the steering has reached the maximum steering angle and advances to step S6 when It1 is equal to or larger than Ithh. On the other hand, when it is determined that It1 is not equal to or larger than Ithh, the second motor current limit value calculating means 24 advances to step S22.

Next, in step S6, a processing is performed in the case in which the steering is determined to have reached the maximum steering angle in step S21. The processing is completely the same as that of the first embodiment and gradually decreases the second motor current limit value as indicated by the expression (4).

Next, in steps S22 and S8, procedures are performed for returning the second motor current limit value gradually decreased in step S6 to an initial value. When the motor current target value It1 is equal to or smaller than the current Ith1 that is small enough compared with the determination threshold value Ithh, the steering is regarded to have returned from the maximum steering angle and advances to step S8, and then promptly causes the second motor current limit value to return to the rated current value I1. On the other hand, when It 1 is larger than Ith1, the previously calculated second motor current limit value is held.

As described above, the second motor current limit value calculating means 24 of the second embodiment operates, using a motor current, such that it gradually decreases the second motor current limit value to a minimum current value that can hold the steering at a maximum steering angle when the steering has reached the maximum steering angle, and flows the rated current I1 in the other cases.

The second embodiment can be easily applied to a steering control device that is not provided with a torque sensor 2 such as a rear steering control device and a steer-by-wire control device.

Figure 3:
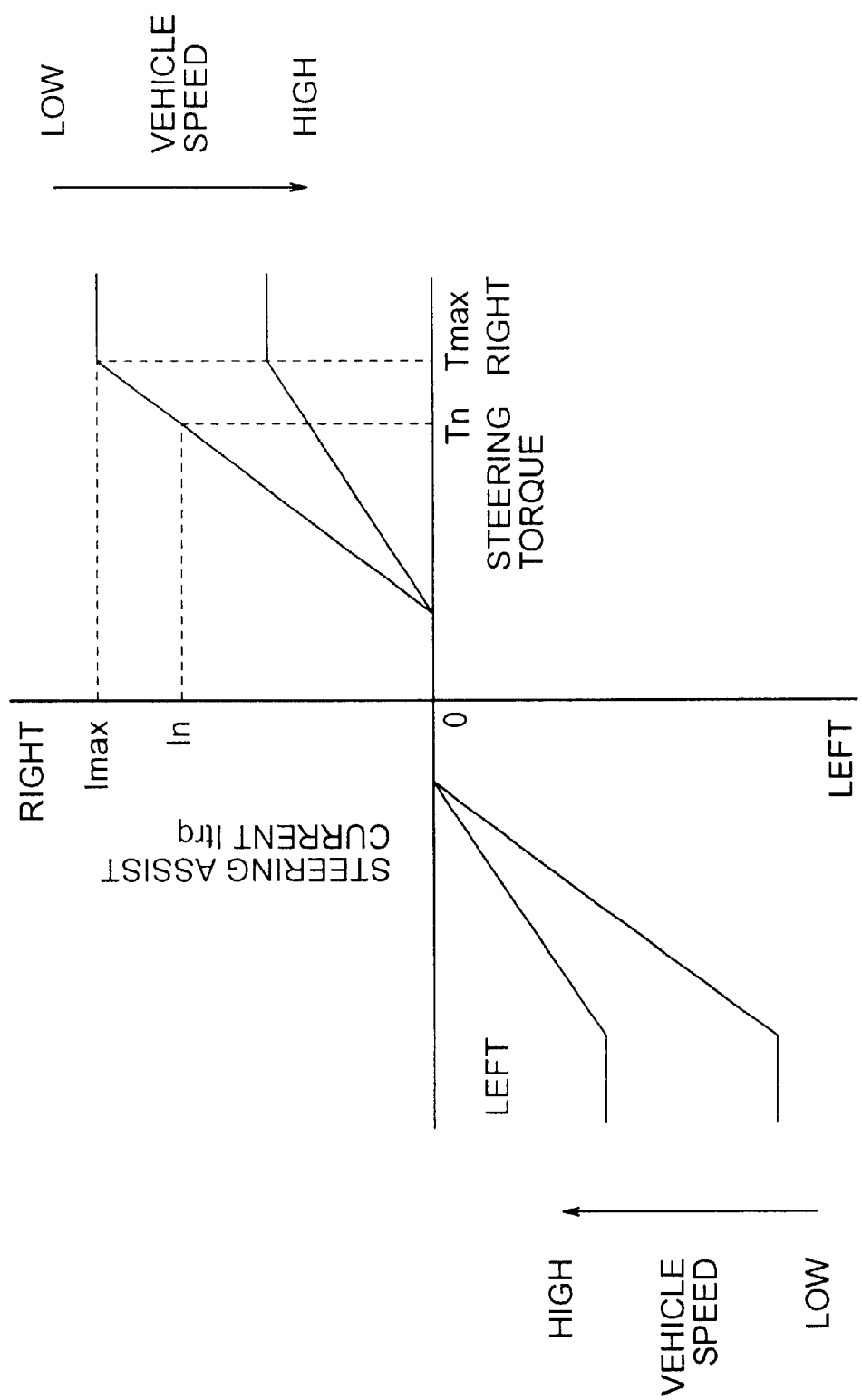
FIG. 3 shows a relation between a steering torque and a steering assist current of the steering control device in accordance with the first embodiment of the present invention.

Further, although a method of setting the maximum steering determination threshold values Ithh and Ith1 is not specifically referred to in the second embodiment, for example, Ithh may be set at a predetermined value that cannot be reached when a vehicle is moving at high speed. As shown in FIG. 3, since the higher the vehicle speed becomes the smaller the motor current, it is not determined that the steering has reached the maximum steering angle while a vehicle is moving by this setting and the second motor current limit value is not decreased. Thus, even if a steering holding torque is large in a situation such as a vehicle moving on a curve, an output torque of a motor can be set not to decrease.

In addition, as shown in FIG. 3, the steering assist current Itrq is generally set such that a motor current is a constant value Imax when it is equal to or larger than the predetermined steering torque Tmax. The steering torque is equal to or smaller than Tmax and a motor current substantially proportional to the steering torque flows in the parts other than the vicinity of the maximum steering angle, whereas the steering torque reaches Tmax and the motor current saturates at Imax in the vicinity of the maximum steering angle. Thus, a threshold value for determining the maximum steering angle may be the saturation value Imax of the motor current. In this way, the maximum steering angle can be surely detected.

In addition, although the motor current is compared with a certain constant value to detect the maximum steering angle in the second embodiment, the steering control device may be configured to compare the motor current with its limit value and determine that the steering has reached the maximum steering angle when the motor current target value It1 and the steering assist current Itrq is equal to or larger than the motor current limit value.

Figure 11:
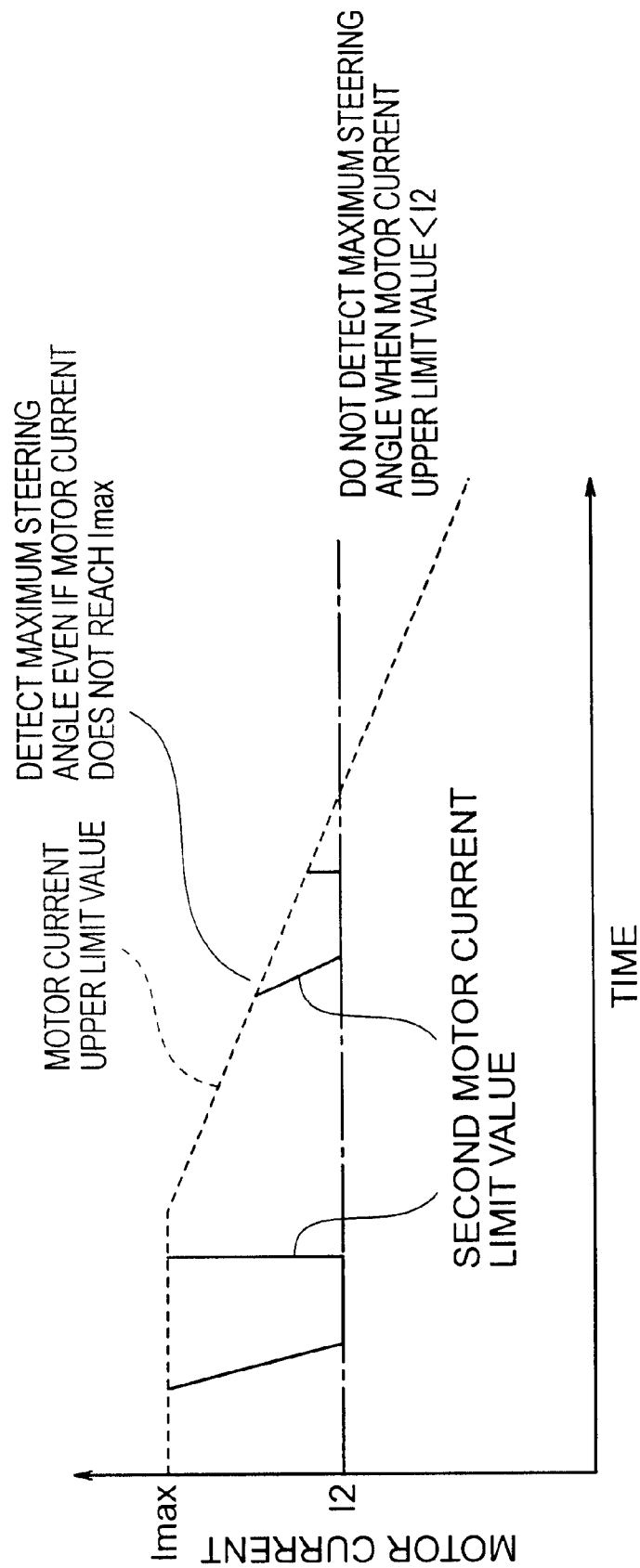
FIG. 11 illustrates setting of a threshold value for determining a maximum steering angle by a motor current of the steering control device in accordance with the second embodiment of the present invention.

An example of an operation in this case is shown in FIG. 11. The maximum steering angle can be detected by this setting as shown in FIG. 11, for example, even if the motor current is limited by the first motor current limit value and does not reach the above-mentioned Imax. In addition, in the case in which it is not necessary to decrease the motor current or product quality is extremely deteriorated when the motor current is more decreased even if the first motor current limit value is sufficiently small, for example, which is equal to or smaller than the above-mentioned I2 and the steering is in the vicinity of the maximum steering angle, it is possible to cause the steering control device to operate not to detect the maximum steering angle and not to decrease the second motor current limit value.

Moreover, although the motor current target value It1 and a predetermined value are compared to detect the maximum steering angle in the second embodiment, the motor current detection value Im and the predetermined value may be compared. When the steering reaches the maximum steering angle and the rotation of the motor 4 stops, a back electromotive force rapidly becomes zero. Thus, the motor current easily overshoots. When a detection value of the motor current is detected as equal to or larger than the predetermined value, the above-mentioned overshoot can be detected and the maximum steering angle can be determined more effectively.

Third Embodiment

A steering control device in accordance with a third embodiment of the present invention will be described with reference to the drawings.

Figure 12:
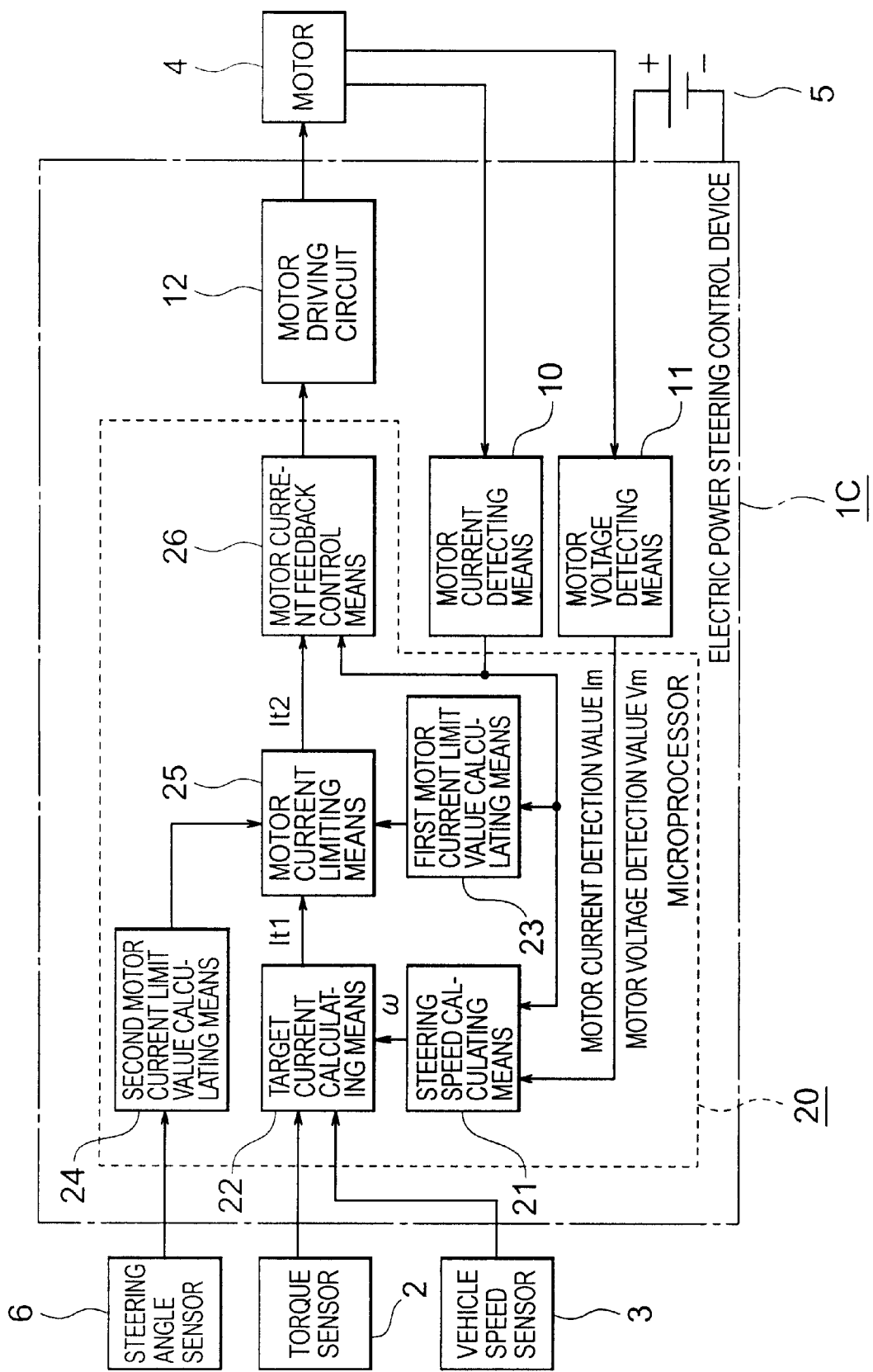
FIG. 12 is a block diagram showing a configuration of a steering control device in accordance with a third embodiment of the present invention.

FIG. 12 shows a configuration of the steering control device in accordance with the third embodiment of the present invention.

Figure 13:
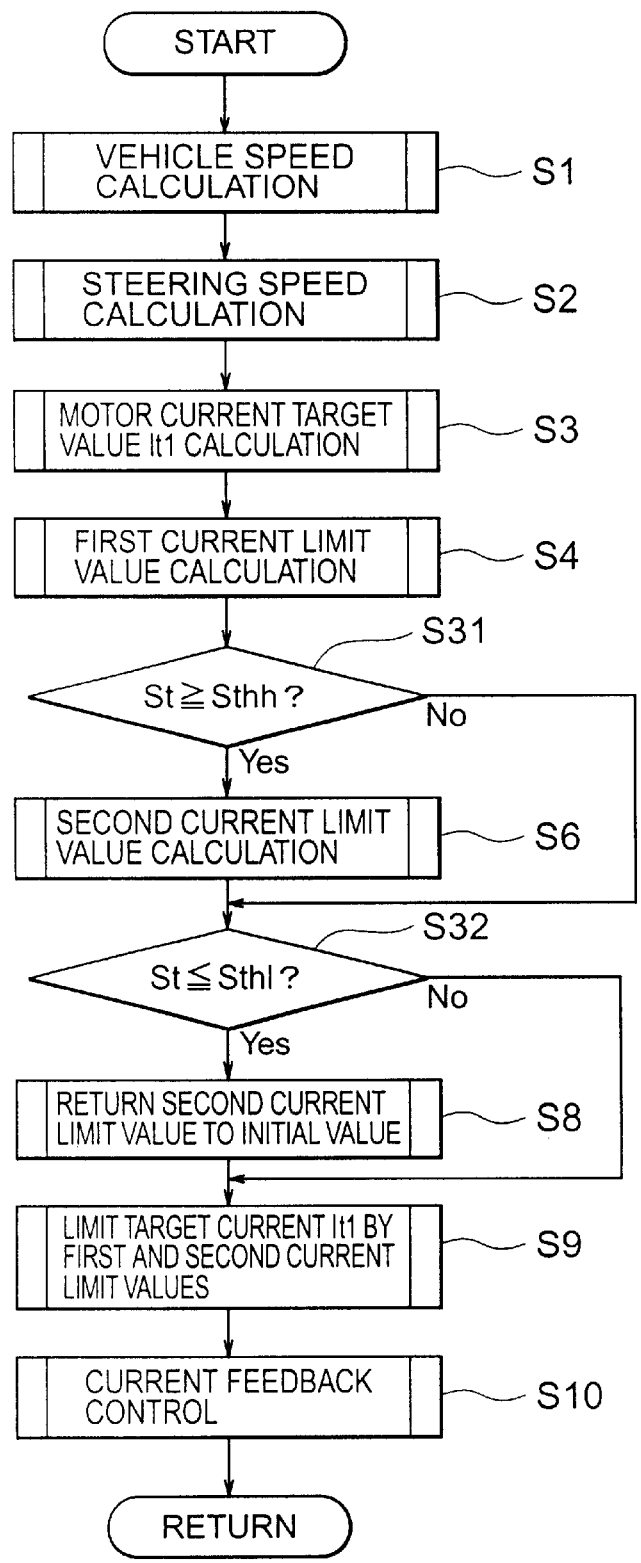
FIG. 13 is a flow chart showing an operation of the steering control device in accordance with the third embodiment of the present invention.

FIG. 13 is a flow chart showing an operation of the steering control device in accordance with the third embodiment of the present invention.

Although a maximum steering angle of a steering is determined by a steering torque and a motor current in the first and the second embodiments, the maximum steering angle may be determined using a steering angle sensor signal when a steering sensor can be utilized.

As shown in FIG. 12, reference numeral 24 denotes a second motor current limit value calculating means for calculating a second motor current limit value using a steering angle, and numeral 6 denotes a steering angle sensor. Other parts are denoted by the reference numerals identical with those for the corresponding parts in the above-mentioned embodiments and descriptions of such parts are omitted.

The operation of the third embodiment is completely the same as that in the above-mentioned embodiments. As indicated by procedures in steps S31, S6, S32 and S8, the second motor current limit value calculating means 24 determines that the steering has reached a maximum steering angle and gradually decreases a second motor current limit value when a steering angle detection value St found by the steering angle sensor 6 is equal to or larger than a predetermined value Sthh. The second motor current limit value calculating means 24 determines that the steering has returned from the maximum steering angle and gradually increases the second motor current limit value when the steering angle detection value St found by the steering angle sensor 6 is equal to or smaller than a predetermined value Sth1. Other values are denoted by reference numerals identical with those for the corresponding values in the above-mentioned embodiments and descriptions of such values are omitted.

As described above, since the maximum steering angle is determined using the steering angle sensor 6 in the third embodiment, the maximum steering angle is detected more precisely and the motor current can be decreased.

In addition, the third embodiment can be easily applied to a steering control device that is not provided with the torque sensor 2 such as a rear steering control device and a steer-by-wire control device.

Further, rather than the steering angle sensor 6 as described above, a switch-like steering sensor for turning on at the maximum steering angle and turning off in other timing can be used to make a determination in the similar manner.

Fourth Embodiment

A steering control device in accordance with a fourth embodiment of the present invention will be described with reference to the drawings.

Figure 14:
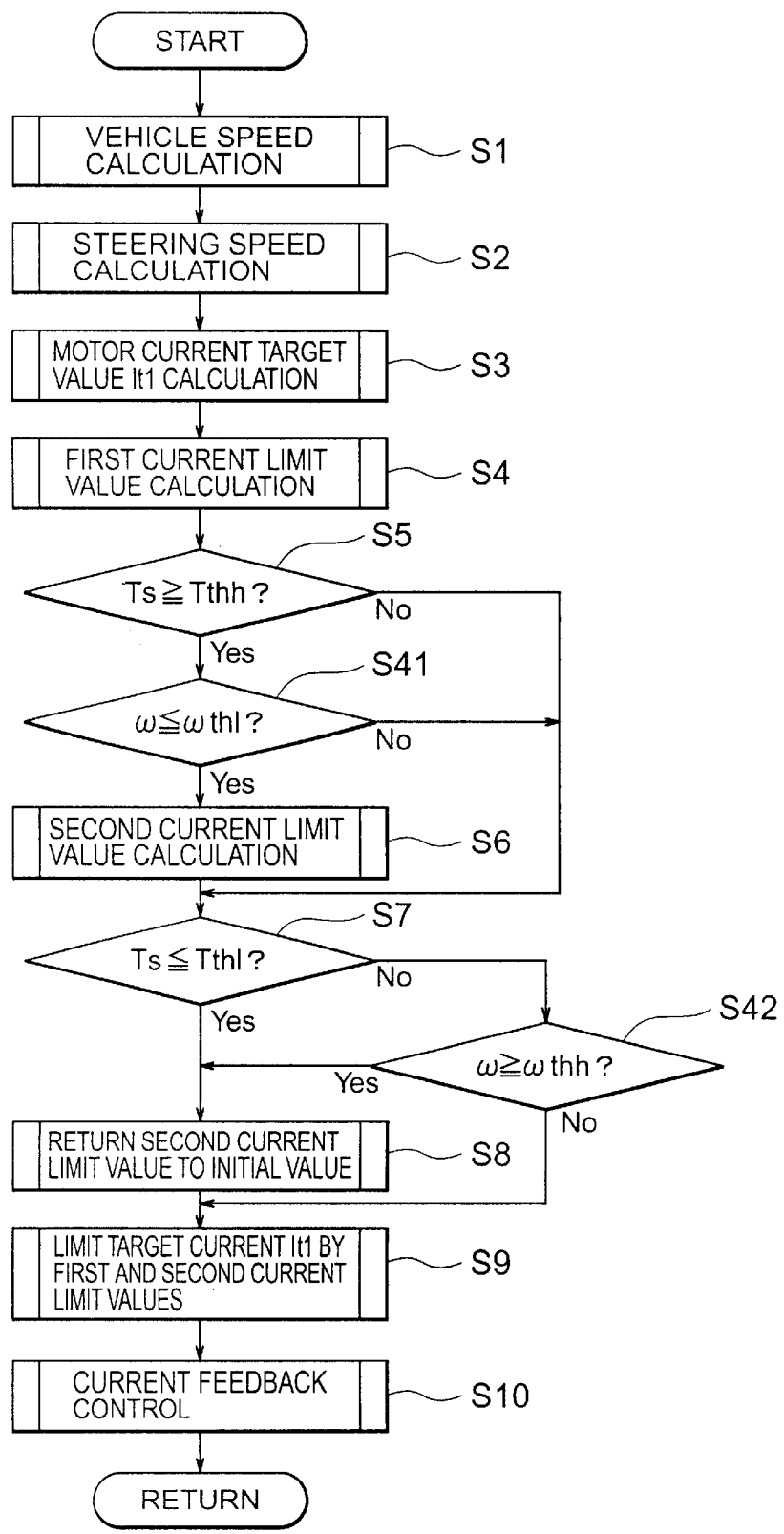
FIG. 14 is a flow chart showing an operation of a steering control device in accordance with a fourth embodiment of the present invention.

FIG. 14 is a flow chart showing an operation of the steering control device in accordance with the fourth embodiment of the present invention.

The second motor current limit value calculating means 24 of the first embodiment may be configured to decrease a second motor current limit value when it is determined that the steering is held in the vicinity of the maximum steering angle and increase the second motor current limit value when it is determined that the steering is being operated while detecting that the steering is in a held state when a steering speed is equal to or smaller than a predetermined value in addition to determining a maximum steering angle.

The configuration of the device is completely the same as that of the first embodiment except that a steering speed signal found by the steering speed calculating means 21 is inputted in the second motor current limit value calculating means 24, thus description thereof is omitted.

In FIG. 14, steps S41 and S42 correspond to the held steering determination according to a steering speed. Further, steps corresponding to those in the first embodiment are denoted by the same reference numerals and descriptions of the steps are omitted.

An operation of the second motor current limit value calculating means 24 will be described based on FIG. 14.

First, in steps S5 and s41, procedures are performed for determining whether the steering is in the held state at the maximum steering angle. When the steering torque Ts detected by the torque sensor 2 is equal to or larger than the predetermined value Tthh, and the steering speed ω calculated by the steering speed calculating means 21 is equal to or smaller than a predetermined value, it is likely that the steering is held at the maximum angle. Thus, the second motor current limit value calculating means 24 determines that the steering has reached the maximum steering angle and held when Ts is equal to or larger than Tthh and ω is equal to or smaller than ωth1 and advances to step S6. In other cases, the second motor current limit value calculating means 24 advances to step S7.

In Step S6, a processing is performed in the case in which it is determined in steps S5 and S41 that the steering has reached the maximum steering angle and is in a held state. The processing is completely the same as that in the first embodiment. For example, as indicated by the expression (4), the second motor current limit value is gradually decreased through the processing.

In Steps S7, S8 and S42, procedures are performed for returning the second motor current limit value gradually decreased in step S6 to an initial value. When the steering torque TS is equal to or smaller than the above-mentioned Tth1 that is small enough compared with the above-mentioned Tthh or the steering speed is equal to or larger than ωthh that is large enough compared with the above-mentioned ωth1, it is likely that the steering has returned from the maximum angle or the held state. Thus, when Ts is equal to or smaller than Tth1 or ω is equal to or larger than ωthh, the second motor current limit value calculating means 24 advances to step S8 and promptly returns the second motor current limit value to the rated current I1. In other cases, the second motor current limit value calculating means 24 holds the previously calculated second motor current limit value.

In this way, the second motor current limit value calculating means 24 of the fourth embodiment gradually decreases the motor current only when the steering is held at the maximum angle. Thus, fluctuation of a motor current can be suppressed when the steering has temporarily reached the maximum steering angle.

Further, although the calculation of the steering speed was performed using the voltage between motor terminals and the motor current detection value detected by the motor current detecting means 10 in the fourth embodiment, a completely the same effect can be realized by calculating the steering speed using a steering speed signal found by a steering angle sensor when the steering angle sensor is provided.

In addition, it is needless to mention that the fourth embodiment can be applied not only to the first embodiment but also to the second and the third embodiments.

Fifth Embodiment

A steering control device in accordance with a fifth embodiment of the present invention will be described with reference to the drawings.

Figure 15:
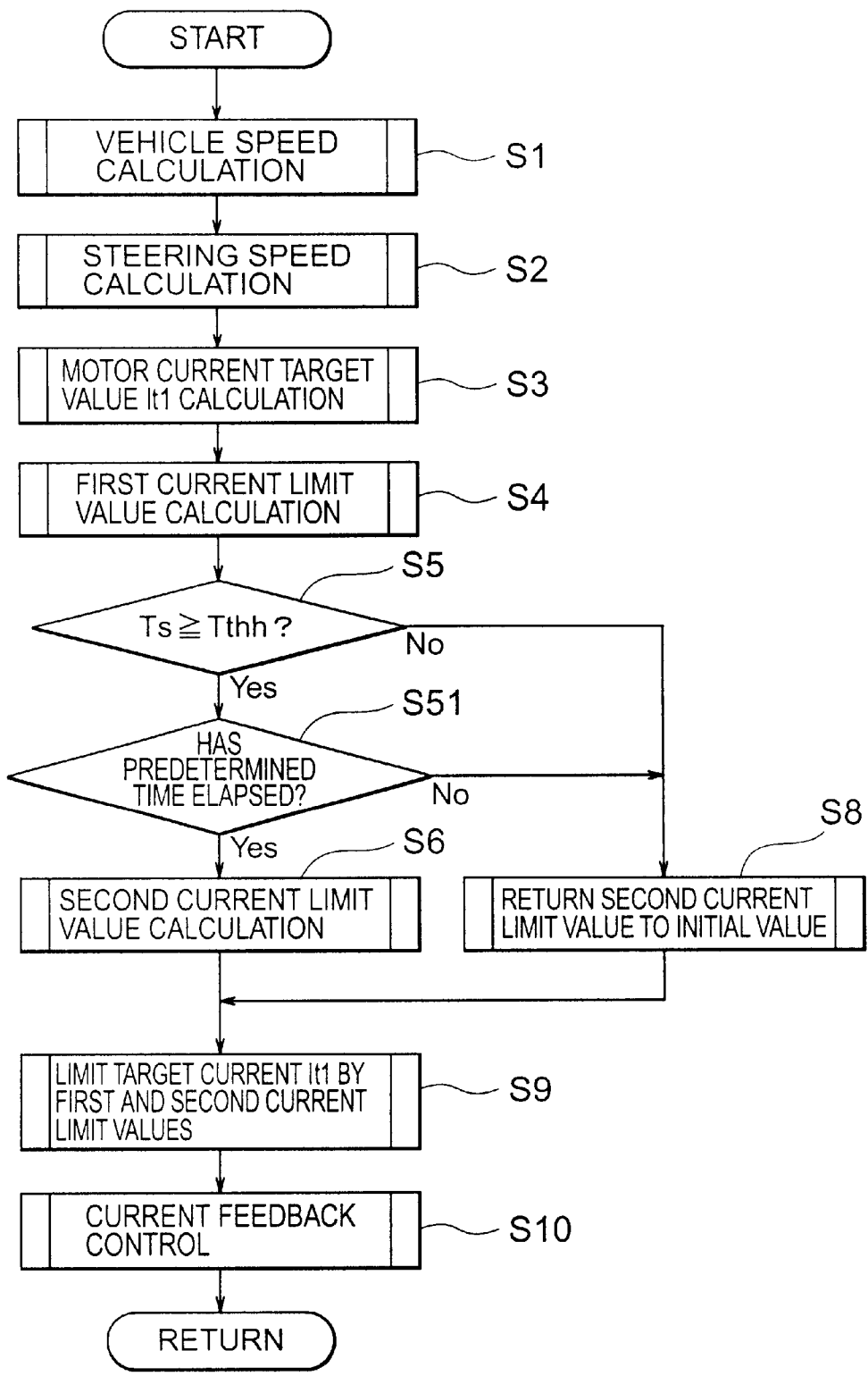
FIG. 15 is a flow chart showing an operation of a steering control device in accordance with a fifth embodiment of the present invention.

FIG. 15 is a flow chart showing an operation of the steering control device in accordance with the fifth embodiment of the present invention.

In each of the above-mentioned embodiments, hysteresis is given to each of the determination of the maximum steering angle and the determination of return from the maximum steering angle, or the determination of the held steering state and the determination of return from the steering held state, by providing determination threshold values respectively, whereby hunting of the second motor current limit value is prevented.

On the other hand, as indicated by procedures in steps S5, S51, S6 and S8 of FIG. 15, the steering control device may be configured to determine that the steering has reached the maximum steering angle when conditions for determining the maximum steering angle are met for a predetermined time period or determine that the steering has returned from the maximum steering angle when conditions for determining the return from the maximum steering angle are met for a predetermined time period. These steps S5, S51, S6 and S8 correspond to a processing of the second motor current limit value calculating means 24. Thus, the above-mentioned hunting can be prevented more effectively.

In addition, the steering control device may be configured to determine that the steering is held when conditions for determining the held steering are met for a predetermined time period or determine that the steering has returned from the held state when conditions for determining the return from the held steering state are met for a predetermined time period. Thus, the above-mentioned hunting can be prevented more effectively.

Figure 16:
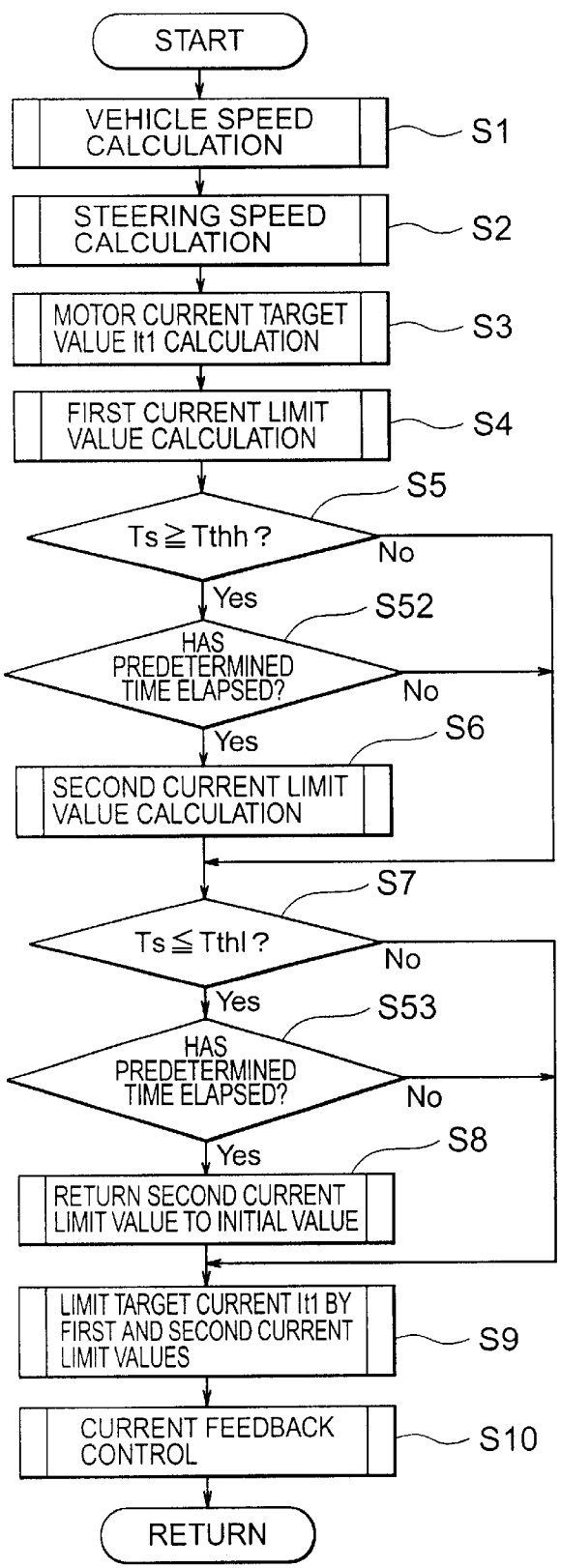
FIG. 16 is a flow chart showing an operation of a steering control device in accordance with a fifth embodiment of the present invention.
Figure 17:
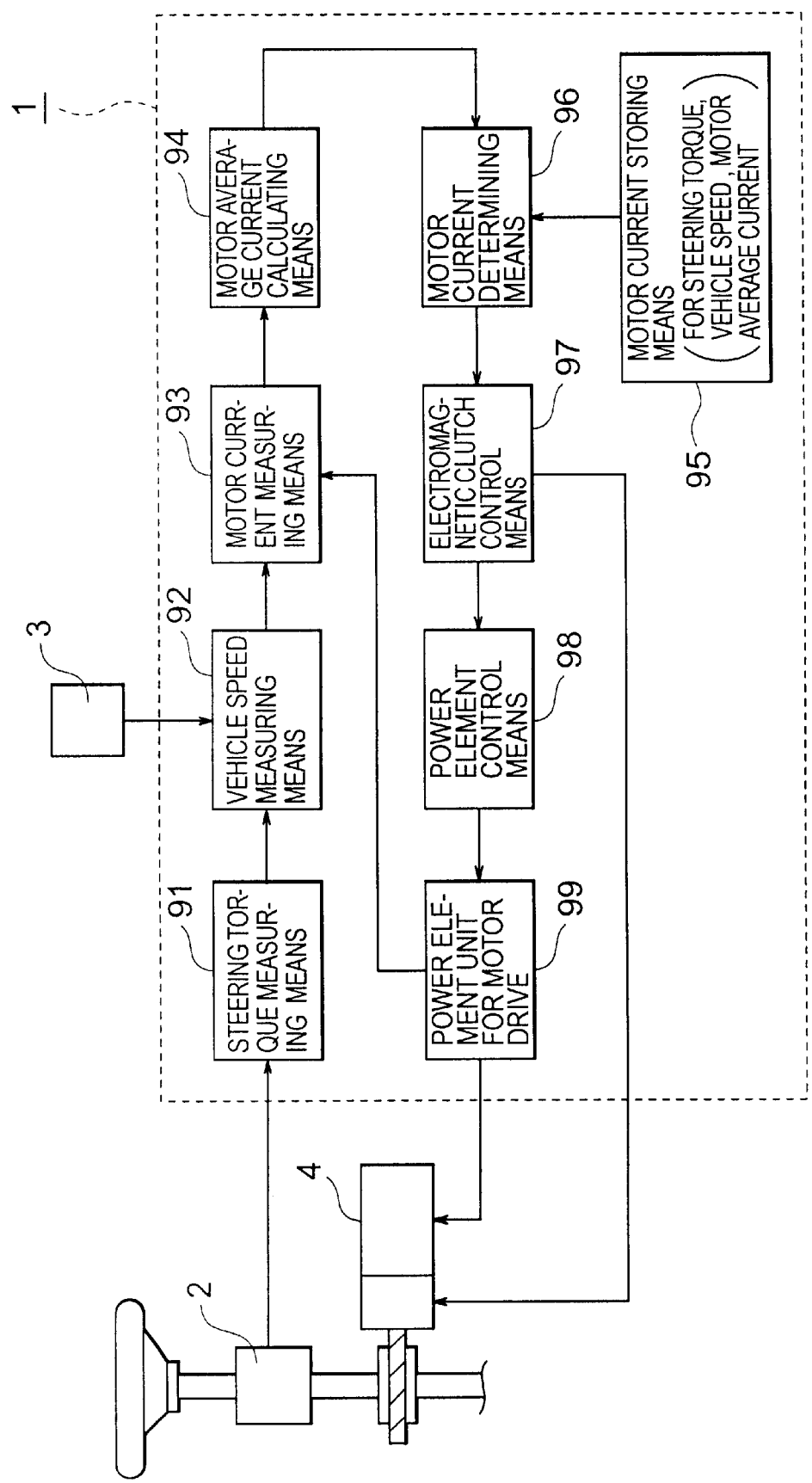
FIG. 17 is a block diagram showing a configuration of a conventional steering control device.
Figure 18:
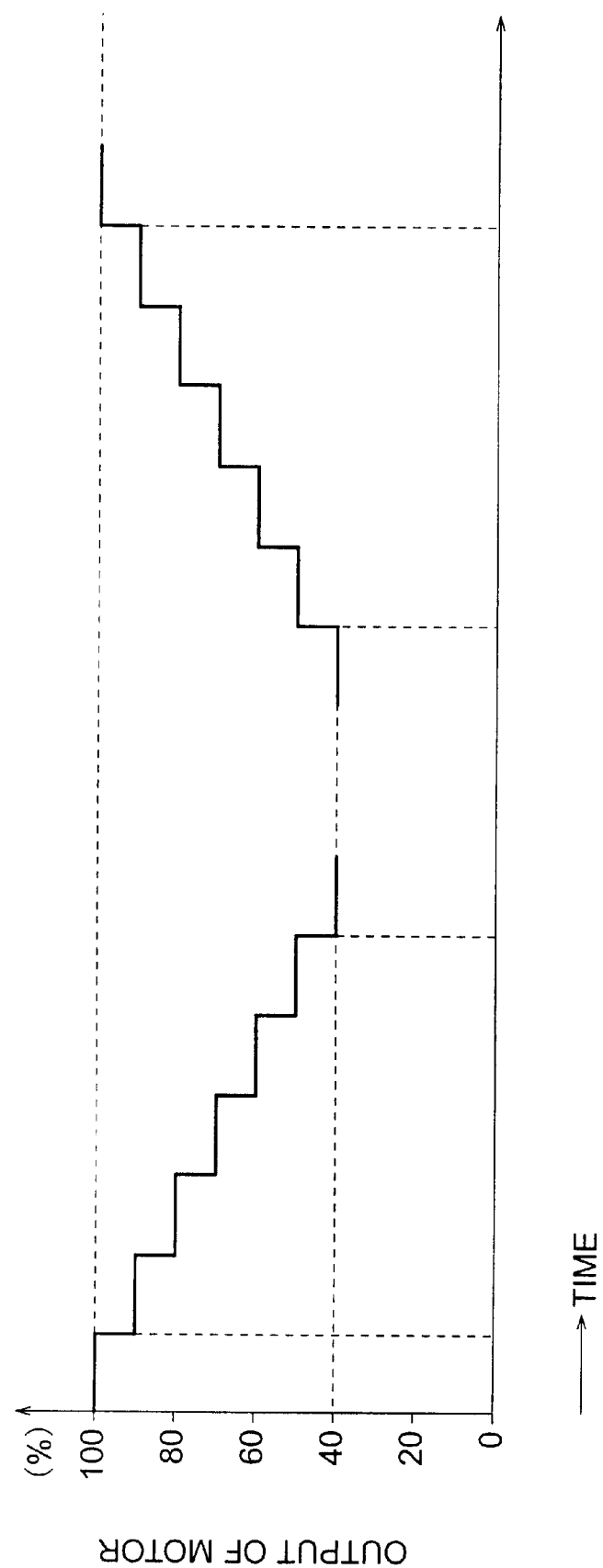
FIG. 18 shows an operation of the conventional steering control device.

Moreover, as shown in FIG. 16, it is needless to mention that the above-mentioned hunting can be prevented more surely when the hysteresis of a determination threshold value and the determinations based on the determination conditions being met for a predetermined time period are simultaneously implemented. Steps S5, S52, S6, S7, S53 and S8 of FIG. 16 correspond to a processing of the second motor current limit value calculating means 24.

Sixth Embodiment

A steering control device in accordance with a second embodiment of the present invention will be described.

Although the second motor current limit value calculating means 24 of each of the above-mentioned embodiments gradually decreases a current when it is determined that the steering has reached the maximum steering angle regardless of whether the vehicle is at rest or moving, the second motor current limit value calculating means 24 may be configured to determine that the steering has reached the maximum steering angle only when the vehicle is moving at low speed. Thus, a case in which while the vehicle is moving the motor current gradually decreases and accordingly an output torque of the motor becomes deficient can be prevented more effectively.

Thus, it is seen that a steering control device is provided. One skilled in the art will appreciate that the present invention can be practiced by other than the preferred embodiments which are presented for the purposes of illustration and not of limitation, and the present invention is limited only by the claims which follow.

What is claimed is:

1. A steering control device comprising:

first motor current limit value calculating means for increasing and decreasing a motor current according to an average value of motor currents over a time period; and second motor current limit value calculating means for decreasing a motor current upon determining that a steering is in the vicinity of a maximum steering angle and increasing a motor current upon determining that the steering is not in the vicinity of the maximum steering angle.

2. A steering control device according to claim 1, wherein said second motor current limit value calculating means determines that the steering is in the vicinity of the maximum steering angle to decrease the motor current when a predetermined state quantity is equal to or larger than a first predetermined value and determines that the steering is not in the vicinity of the maximum steering angle to increase the motor current when said predetermined state quantity is equal to or smaller than a second predetermined value.

3. A steering control device according to claim 1, wherein said second motor current limit value calculating means determines that the steering is in the vicinity of the maximum steering angle to decrease the motor current when a predetermined state quantity is equal to or smaller than a first predetermined value and determines that the steering is not in the vicinity of the maximum steering angle to increase the motor current when said predetermined state quantity is equal to or larger than a second predetermined value.

4. A steering control device according to claim 2, wherein said predetermined state quantity is a steering torque.

5. A steering control device according to claim 2, wherein said predetermined state quantity is a steering angle.

6. A steering control device according to claim 2, wherein said predetermined state quantity is a motor current.

7. A steering control device according to claim 6, wherein said first predetermined value is a saturation value of said motor current.

8. A steering control device according to claim 6, wherein said first predetermined value is a motor current limit value.

9. A steering control device according to claim 8, wherein said first predetermined value is a motor current limit value found by said first motor current limit value calculating means.

10. A steering control device according to claim 6, wherein said predetermined state quantity is a detection value of a motor current.

11. A steering control device according to claim 3, wherein said predetermined state quantity is a steering speed.

12. A steering control device according to claim 11, wherein said steering speed is calculated at least from a motor voltage and a motor current.

13. A steering control device according to claim 1, wherein a motor is controlled with a smaller one of a first motor current limit value found by said first motor current limit value calculating means and a second motor current limit value found by said second motor current limit value calculating means as a limit value of a motor current.

14. A steering control device according to claims 2, wherein determination threshold values indicating that the steering is in the vicinity of the maximum steering angle are said first and second predetermined values and hysteresis is provided by setting said first and second predetermined values to be different from each other.

15. A steering control device according to claims 1, wherein said second motor current limit value calculating means determines that the steering is in the vicinity of the maximum steering angle when a first determination condition for determining that the steering is in the vicinity of the maximum steering angle is met for a predetermined time period or more and determines that the steering is not in the vicinity of the maximum steering angle when a second determination condition for determining that the steering is not in the vicinity of the maximum steering angle is not met for a predetermined time period or more.

16. A steering control device according to claim 1, wherein said second motor current limit value calculating means increases or decreases a motor current only when a vehicle speed is equal to or smaller than a predetermined value.

17. A steering control device according to claim 1, wherein said second motor current limit value calculating means sets an increasing speed of a motor current larger than a decreasing speed.

18. A steering control device comprising:
motor current detecting means for detecting a motor current;
motor voltage detecting means for detecting a motor voltage;
a motor driving circuit for driving a motor; and
a microprocessor for supplying an applied voltage signal, which is found based on a motor current detection value detected by said motor current detecting means, a motor voltage detection value detected by said motor voltage detecting means, a steering torque detected by a torque sensor and a vehicle speed detected by a vehicle speed sensor, to said motor driving circuit such that said motor driving circuit increases or decreases the motor current according to an average value of motor current detection values over a time period and increases or decreases the motor current by detecting that a steering is in the vicinity of a maximum steering angle based on a predetermined state quantity.

19. A steering control device according to claim 18, wherein said microprocessor comprises:
steering speed calculating means for calculating a steering speed based on said motor current detection value and said motor voltage detection value;
target current calculating means for calculating a motor current target value based on said detected steering torque, said detected vehicle speed and said steering speed;
first motor current limit value calculating means for calculating a first motor current limit value based on said motor current detection value;
second motor current limit value calculating means for calculating a second motor current limit value using said predetermined state quantity;
motor current limiting means for limiting said calculated motor current target value using said first motor current limit value and said second motor current limit value; and
motor current feedback control means for finding a voltage signal applied to said motor such that said limited motor current target value and said motor current detection value coincide with each other.

* * * * *